United States Patent [19]

Yoshizumi et al.

[11] Patent Number: 4,719,255
[45] Date of Patent: Jan. 12, 1988

[54] EPOXY RESIN COMPOSITION FOR ENCAPSULATION OF SEMI-CONDUCTOR DEVICE

[75] Inventors: Akira Yoshizumi, Yokohama; Hisayuki Hirai, Chiba; Kazutaka Matsumoto, Yokohama; Shinetsu Fujieda; Michiya Higashi, both of Kawasaki, all of Japan

[73] Assignee: Kabushiki Kaisha Toshiba, Japan

[21] Appl. No.: 760,770

[22] Filed: Jul. 31, 1985

[30] Foreign Application Priority Data

Aug. 23, 1984 [JP] Japan .................. 59-174147
Mar. 26, 1985 [JP] Japan .................. 60-59457

[51] Int. Cl.$^4$ .............................................. C08L 63/00
[52] U.S. Cl. .................................... 523/436; 523/438; 523/456; 525/58
[58] Field of Search ............... 523/434, 438, 456, 436; 525/57, 58

[56] References Cited

U.S. PATENT DOCUMENTS

| | | | |
|---|---|---|---|
| 3,057,614 | 10/1962 | Greenlee | 260/23.7 |
| 3,098,054 | 7/1963 | Rosenberg | 260/41 |
| 3,838,094 | 9/1974 | Sporck | 260/37 EP |
| 3,932,689 | 1/1976 | Watanabe | 525/58 |
| 4,304,880 | 12/1981 | Flowers | 525/58 |
| 4,379,916 | 4/1983 | Flowers | 525/58 |

FOREIGN PATENT DOCUMENTS 57-184242 11/1982 Japan.
58-87121 5/1983 Japan.

OTHER PUBLICATIONS

"Epoxy Resins"—Henry Lee & Kris Neville, pp. 3–21.
"Tg and Modulus of Various Epoxy Resins" (Torsional Rectangular Analysis) Dainippon Ink and Chemicals, Inc.
Abstract of Japan No. 57184242.
Abstract of Japan No. 58087121.
Patent Abstracts of Japan (Jun. 22, 1983), vol. 7, No. 143 (C-172) (1288).
Patent Abstracts of Japan (Aug. 28, 1984), vol. 8, No. 187 (C-240) (1624).
European Search Report.

*Primary Examiner*—C. Warren Ivy
*Attorney, Agent, or Firm*—Schwartz Jeffery Schwaab Mack Blumenthal & Evans

[57] ABSTRACT

An epoxy resin composition for encapsulation of semiconductor device comprises the components (a), (b), (c) and at least one of the components (d) and (e) as shown below:
  (a) 100 parts by weight of an epoxy resin having at least 2 epoxy groups in one molecule;
  (b) 8 to 65 parts by weight of a novolak type phenolic resin with an ortho ratio less than 50%;
  (c) 1.2 to 40 parts by weight of a polyvinyl acetal compound;
  (d) 0.8 to 30 parts by weight of a silicone oil; and
  (e) 4 to 80 parts by weight of a rubber-modified phenolic resin.

The described epoxy resins composition for encapsulation of semiconductor devices can retain its high glass transition temperature in the cured product and also has low modulus of elasticity, as well as excellent humidity resistance and thermal shock resistance.

13 Claims, No Drawings

EPOXY RESIN COMPOSITION FOR ENCAPSULATION OF SEMI-CONDUCTOR DEVICE

BACKGROUND OF THE INVENTION

This invention relates to an epoxy resin composition for encapsulation of a semiconductor device, more particularly to an epoxy resin composition for encapsulation of semiconductor device, which can provide a cured product retaining a high glass transition temperature and which has a low modulus of elasticity as well as excellent humidity resistance and thermal shock resistance.

Generally speaking, it has been a common practice during manufacturing of resin encapsulated semiconductor devices to encapsulate semiconductor elements directly with a semiconductor-encapsulation resin.

In recent years, as the degree of integration has increased in the field concerning encapsulation of semiconductors, minute elaboration of various functional units on chip elements and enlargement of the semiconductor chip itself have likewise progressed rapidly. Due to the changes in these semiconductor chips, the encapsulation resins of the prior art can no longer satisfy present requirements. The epoxy resin compositions cured with a phenolic novolak resin, which have been employed in the prior art as resins for encapsulation of semiconductor devices, display excellent hygroscopicity characteristics high temperature electrical characteristics, moldability, etc., and thus represent the mainstream of the resins for molding.

However, when a semiconductor chip characterized by a large scale and a minute surface structure is encapsulated using this type of resin composition, the thermal stress strain generated by the difference in thermal expansion between the inner encapsulated material and the encapsulating resin may cause cracks on the phosphoric silicate glass (PSG) film or the silicon nitride (SiN) film, which is a coating material (passivation film) for protection of an aluminum (Al) pattern on the semiconductor chip surface. There can also occur cracks in the semiconductor chip, wire breaking of the bonding wire, and cracks in the resin molded product after encapsulation. In fact, the tendency for cracks to occur is very great when thermal cycle test is practiced. A decline in element characteristics can result due to chip cracking or to corrosion of the Al pattern caused by cracking of the protective film.

As countermeasures against such problems, it is necessary to increase the stress placed by the encapsulating resin on the inner encapsulated material, and also to increase adhesion of the encapsulating resin to the glass film (such as PSG film or SiN film) on the element. It is also required in the cured product to suppress the content of hydrolyzable halide compounds, particularly chloride ions, in order to minimize corrosion of Al pattern on the element surface, and also to maintain electrical insulating performance at a high level under humid or high temperature conditions.

To decrease the stress, a resin with small modulus of elasticity, low expansion ratio and low glass transition temperature should be used, but the glass transition temperature still must to be at a certain level or higher to obtain thermal shock resistance, particularly to prevent wire breaking of the bonding wire. Basically, it is necessary to maintain the glass transition temperature (150° C.) of the encapsulating resin which has been employed for encapsulation of semiconductors in the prior art. But, if the resin is modified with a known flexibility-imparting agent for lowering modulus of elasticity, even when the effect of lowering in modulus of elasticity may be recognized, the glass transition temperature will abruptly be lowered to lower resistance to bonding wire opening. Also, when fillers are increased in amount for the purpose of lowering expandability, the coefficient of thermal expansion may be made smaller, but the modulus of elasticity will be increased, and moldability will also worsen due to increased viscosity. According to such prior art techniques, no encapsulating resin with a high glass transition temperature, low modulus of elasticity and low thermal expansion ratio could be obtained.

SUMMARY OF THE INVENTION

An object of the present invention is to overcome the problems as described above and to provide an epoxy resin composition for encapsulation of semiconductor devices that can retain a high glass transition temperature in the cured product and that also combines low modulus of elasticity, excellent humidity resistance and thermal shock resistance.

The epoxy resin composition of the present invention for encapsulation of semiconductor devices comprises (a), (b), (c) and at least one of (d) and (e) as shown below:

(a) 100 parts by weight of an epoxy resin having at least two epoxy groups in one molecule;

(b) 8 to 65 parts by weight of a novolak type phenolic resin with an ortho ratio less than 50%;

(c) 1.2 to 40 parts by weight of a polyvinyl acetal resin;

(d) 0.8 to 30 parts by weight of a silicone oil; and (e) 4 to 80 parts by weight of a rubber-modified phenolic resin.

DETAILED DESCRIPTION OF THE INVENTION

The epoxy resin (a) which is one component in the composition according to the present invention may be any compound having at least two epoxy groups in one molecule, as exemplified by a bisphenol A type epoxy resin, a novolak type epoxy resin, an alicyclic type epoxy resin, a glycidyl ester type epoxy resin, etc., which may also be used in combination. Typical examples of suitable epoxy resins include:

EOCN-102S (tradename), produced by Nihon Kayaku K.K., is a solid, multifunctional epoxy resin typically having a softening point of 74° C. and an epoxy equivalent of 215.

ECN-1273 (trade name), produced by Ciba Geigy Co. ECN-1273 is a novolak type epoxy resin obtained by reacting a derivative of o-cresol formaldehyde novolak with epichlorohydrin. The typical properties of this resin are as follows: molecular weight: about 1080; WPE (epoxy equivalent): 225; epoxy value: 4.5 eq/kg; esterification equivalent: 90; melting point: 73° C.; specific gravity: 1.16.

EPPN-201 (tradename), produced by Nihon Kayaku K.K., is a solid multifunctional epoxy resin typically having a softening point of 65° C. and an epoxy equivalent of 181.

Epikote 1001 (trade name), produced by Shell Chemical. Epikote 1001 is a bisphenol A type epoxy resin prepared by a condensation reaction of bisphenol A with epichlorohydrin. Its properties are as follows: color number (25° C.) (Gardner): 0.6; viscosity (25° C.) (Gardner Holtz): D-F; epoxy equivalent (Duran mercury method): 68° C.; melting point (Duran mercury method): 68° C.; flash point (PMCC): higher than 200° C.; specific gravity (25° C.): 1.119; molecular weight: about 900.

Chissonox 201 (trade name), produced by Chisso K.K. Chissonox 201 is an alicyclic epoxy resin. Its structural formula is as follows:

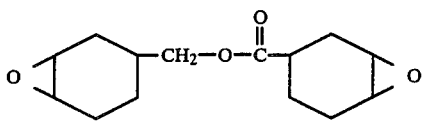

The properties of this resin are: boiling point (at 5 mmHg): 198° C.; specific gravity (25/25° C.): 1.164–1.185; viscosity (at 25° C.): 350–600 cps; hue (Hasen): 150 or less; epoxy equivalent: 131–145; molecular weight: 252.

Chissonox 289 (trade name), produced by Chisso K.K. Chissonox 289 is also an alicyclic epoxy resin. Its structural formula is as follows:

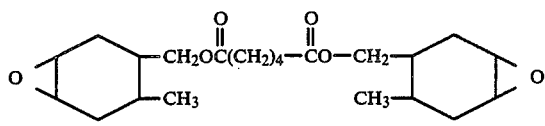

Its properties are: boiling point (at 5 mmHg): 222° C.; specific gravity (25/25° C.): 1.114–1.128; viscosity (at 25° C.): 800–1,100 cps; hue (Hasen): 150 or less; epoxy equivalent: 205-22; molecular weight: 394.

Among the above-mentioned epoxy resins, those having softening points of 60°-100° C., particularly 70°-85° C., are preferred. Also, those having epoxy equivalents of 100 to 300, particularly 175-220, are preferred.

The component (a) is constituted of 100 parts by weight of an epoxy resin as the base, which may be substituted with 0 to 20 parts by weight of a flame retardant epoxy resin. Typical examples of the flame retardant epoxy resins are BREN (trade name, produced by Nihon Kayaku K.K., softening point: 87° C., epoxy equivalent; 270), etc.

The novolak type phenolic resin (b) according to the present invention may be any one having an ortho ratio less than 50%, as exemplified by those having two or more phenolic hydroxyl groups such as a phenolic novolak resin, a cresol novolak resin and the like, preferably those having an ortho ratio within the range from 20 to 30%. In the present invention, the ortho ratio is defined as the ratio of (1) methylene bondings involving methylene groups both bonded at ortho positions to (2) those bonded at ortho and para positions, respectively, plus those where both methylene groups are bonded at ortho positions relative to a hydroxyl group of phenol in the structure of the phenolic resin. If the ortho ratio is 50% or more, the residual stress in the resin when encapsulated will become undesirably great. Of the above-mentioned novolak type phenolic resins, those having softening points of 60°-120° C., particularly 80°-100° C., are preferred, and those having hydroxyl equivalents of 100-150, particularly 100-110, are preferred.

The proportion of the component (b) formulated may generally be 8 to 65 parts by weight, preferably 12 to 55 parts by weight. If the proportion formulated is less than 8 parts by weight, the strength of the cured resin product will be weakened undesirably. On the other hand, at a level exceeding 65 parts by weight, the humidity resistance of the encapsulating resin will be lowered desirably.

The polyvinyl acetal resin (c) according to the present invention may include a polyvinyl hexylal resin, a polyvinyl propional resin, a polyvinyl acetoacetal resin, a polyvinyl butyral resin, a polyvinyl formal resin and the like. Typical examples of these resins are Ethlec BMS (trade name, produced by Sekisui Kagaku K.K., viscosity of 10% solution in ethanol/toluene=1/1 at 25° C.: 80-150 cP, butyral groups: 70 mole % or more), Ethlec BL-1 (trade name, produced by Sekisui Kagaku K.K., viscosity at 25° C.: 10-30 cP, butyral groups: 63 mole %), Ethlec BL-S (trade name, produced by Sekisui Kagaku K.K., viscosity at 25° C.: 10-30 cP, butyral groups: 70 mole % or more), Vinylec B-2 (trade name, produced by Chisso K.K., formal content: 81% or more), etc.

Of the above polyvinyl acetal resins, those having viscosities of 5 to 400 cP (measured at 25° C.) (viscosities of 10% solutions in ethanol/toluene=1/1), particularly 10 to 200 cP, are preferred.

The proportion of component (c) formulated may generally be 1.2 to 40 parts by weight, preferably 5 to 30 parts by weight. If the proportion formulated is less than 1.2 parts by weight, the effect of improvement of thermal shock resistance is insufficient, while the proportion formulated over 40 parts by weight results in undesirable deterioration of moldability of the resin.

The siicone oil (d) according to the present invention may be any compounds having recurring units of —[Si—O]— which is liquid at ordinary temperature, as exemplified by dimethyl silicone oil and methylphenyl silicone oil.

Modified products of these silicone oils may also be available, including, for example, a methylhydrogen silicone oil, a poly-di-organosiloxane oil, a fluorosilicone oil, a silicone polyether copolymer oil, an alkyl-modified silicone oil, a fatty acid-modified silicone oil, an amino-modified silicone oil and a epoxy-modified silicone oil. Of the above-mentioned silicone oils, those having viscosities (20° C.) of 500 to 1,000,000 cP, particularly 50,000 to 500,000 cP, are preferred.

The proportion of component (d) formulated may generally be 0.8 to 30 parts by weight, preferably 1.6 to 6 parts by weight. If the proportion formulated is less than 0.8 parts by weight, no sufficient improvement of the humidity resistance and thermal shock resistance can be brought about, while the surface of the cured product will be contaminated by blooming of the silicone oil at a level in excess of 30 parts by weight.

As the rubber-modified phenolic resin (e) to be used in the present invention, any of those generally known as rubber-modified phenolic resins may be available, including, for example, resins obtained by the reaction between conjugated diolefins such as isoprene, 1,3-pentadiene, 1,3-butadiene and the like with novolac type phenolic resins, based upon phenols such as phenol, cresol, xylenol, p-t-butyl phenol and the like, in the presence of a Friedel-Crafts type catalyst. Typical examples are RN-3430 (trade name, produced by Mitsui Toatsu Kagaku K.K., softening point: 97° C., hydroxyl equivalent: 139, rubber component: 30%), RN-3410

(trade name, produced by Mitsui Toatsu Kagaku K.K., softening point: 100° C., hydroxyl equivalent: 121, rubbery component: 10%), RN-3510 (trade name, produced by Mitsui Toatsu Kagaku K.K., softening point: 98° C., hydroxyl equivalent: 119, rubbery component: 10%), etc. Among them, in aspect of improvement of thermal shock resistance, RN-3430 is preferred.

The proportion of component (e) formulated may generally be 4 to 80 parts by weight, preferably 8 to 60 parts by weight. If the proportion formulated is less than 4 parts by weight, lowering in modulus of elasticity can insufficiently be effected, while the encapsulating resin will be lowered in humidity resistance at a level in excess of 80 parts by weight.

The rubber-modified phenolic resin (e), like the novolak type phenolic resin (b), can act as a curing agent for the epoxy resin (a). Accordingly, it is desirable to formulate the epoxy resin so that the equivalent ratio of phenolic resin curing agent (that is, sum of component (b) and component (e)) to epoxy resin may be 0.8 to 1.2

In the present invention, it is preferred that both of the silicone oil (Component d) and the rubber-modified phenolic resin (Component e) are combinedly used since various properties such as humidity resistance, thermal shock resistance and low modulus elasticity which are required for the semiconductor device encapsulating resin could be satisfied with good balance.

Having described about the respective components constituting the present invention, in the case of an epoxy resin composition containing (a), (b), (c) and (e) components, the following conditions with respect to the components (a), (b) and (c) should further preferably be satisfied.

First, as the epoxy resin of the component (a), a novolak type epoxy resin is preferred, which may be any of those generally known as novolak type epoxy resins, such as cresol novolak type epoxy resins, phenol novolak type epoxy resins, brominated phenol novolak type epoxy resins, etc. At least one resin selected from the group consisting of these resins may be used. Among them, for easiness in handling and various characteristics such as moldability, it is preferred to use a resin having a softening point of 65° to 95° C. and an epoxy equivalent of 180 to 280, containing hydrolyzable halogens (e.g. chlorine) in an amount as little as possible.

The proportion of component (a) formulated based on the entire composition may generally be 10% to 25% by weight, preferably 15% to 20% by weight. At a level less than 10% by weight, humidity resistance will be worsened, while the strength of the material will be lowered at a level over 25% by weight.

As the novolak type phenolic resin (b), a phenolic novolak resin is preferred, which may be any of those generally known as phenolic novolak resins with an ortho ratio less than 50%, including, for example, resins obtained by the reaction between phenol and/or an alkyl phenol and formaldehyde or para-formaldehyde, such as BRM-557 (trade name, produced by Showa Union Gosei K.K., softening point 87° C., OH group equivalent 104), BRM-558 (trade name, produced by Showa Union Gosei K.K., softening point: 98° C., OH group equivalent: 104). At least one selected from the group consisting of these resins can be employed. Among them, it is preferred to use a phenolic novolak resin in which the content of unreacted phenol in the resin is suppressed to 0.5% by weight or less, in order to enhance the cross-linking density in the composition of the present invention and prevent deleterious influences by the monomer on semiconductor elements. Since chloride ions will promote corrosion of aluminum wiring in semiconductor elements, it is not desirable to use an addition condensation catalyst containing chlorine atoms such as hydrochloric acid for synthesis of the phenolic resin. Also, the softening point of the phenolic resin should preferably be 70° C. to 110° C., for easiness in handling and in aspect of moldability.

The polyvinyl acetal resin (c) may preferably be a polyvinyl butyral resin, which may be any of those generally known as polyvinyl butyral resins such as Ethlec BMS, Ethlec BL-1, Ethlec BL-S as mentioned above, and at least one selected from the group consisting of these can be used. Among, them, in aspect of dispersibility and humidity resistance, Ethlec BMS is preferred.

The composition of the present invention may also contain curing accelerators and silica powder as described below in addition to the above components.

The curing accelerator to be used in the present invention may be any of the curing accelerators generally known in the art, including, for example, tertiary amines such as 2-(dimethylaminomethyl)phenol, 2,4,6-tris-(dimethylaminomethyl)phenol, benzyldimethylamine, α-methylbenzyldimethylamine; imidazole and imidazole derivatives such as 2-methylimidazole, 2-phenylimidazole, 2-heptadecylimidazole, 2-ethyl-4-methylimidazole, etc.; phosphine derivatives such as triphenylphosphine, etc.; cycloamidine, 1,8-diaza-bicycloundecene, etc., and at least one selected from the group consisting of these may be used. Among them, triphenylphosphine is preferred in aspect of humidity resistance.

The proportion of the curing accelerator formulated may preferably be 0.4 to 10 parts by weight, more preferably 0.6 to 4 parts by weight. If the proportion formulated is less than 0.4 parts by weight, the curing speed will be slow, while humidity resistance may sometimes be worsened in excess of 10 parts by weight.

The silica powder to be used in the present invention may be any one of those generally known as silica powder, including, for example, quartz glass powder and crystalline silica powder. Also, spherical silica powder may be used. Among these silica powders, one having a mean particle size of 2 to 25μ is preferred.

The proportion of the silica powder formulated may preferably be 260 to 850 parts by weight, more preferably 268 to 700 parts by weight. At a level less than 260 parts by weight, thermal expansion ratio of the cured product will become so large that thermal shock resistance is lowered, while an excess over 850 parts by weight sometimes will lower fluidity of the composition to deteriorate its moldability.

The composition of the present invention may further contain, if desired, fillers such as zircon, silica, molten quartz glass, alumina, aluminum hydroxide, glass, quartz glass, calcium silicate, gypsum, calcium carbonate, magnesite, clay, kaolin, talc, iron powder, copper powder, mica, asbestos, silicon carbide, boron nitride, molybdenum dioxide, lead compounds, lead oxides, zinc flower, titanium white, carbon black, etc.; mold releasing agents such as natural wax, synthetic wax, higher fatty acids and metal salts thereof, or paraffin, etc.; coupling agents such as epoxysilane, vinylsilane, aminosilane, borane compounds, alkoxytitanate compounds, aluminium chelate compounds, etc.; flame retardants such as antimony trioxide, antimony pentoxide, phosphorus compounds, known compounds containing bromine or chlorine; colorants such as carbon.

The method for preparation of the epoxy resin composition for semiconductor-device encapsulation according to the present invention is now described. More specifically, the composition of the present invention can be prepared easily by crushing the respective components as described above, mixing them homogeneously by means of a mixing machine such as Henschel mixer, etc. and then melting and kneading the mixture by means of heated rolls, heated heater, kneader, heated extruder, etc., followed by cooling of the resin subjected to B-staging and mixing by a special mixing machine after micropulverization, or according to any desired combination of these methods.

The present invention is described below in more detail by reference to Examples and Comparative examples.

In Examples and Comparative examples, all "parts" mean "parts by weight".

EXAMPLE 1

100 parts of an ortho-cresol novolak type epoxy resin (softening point: 74° C., epoxy equivalent: 216), 14 parts of a brominated phenol novolak epoxy resine (bromine content: 30%, softening point: 87° C., epoxy equivalent: 270), 50 parts of a phenolic novolak resin (ortho ratio: 25%, softening point: 95° C., hydroxyl equivalent: 104), 12 parts of polyvinyl butyral (viscosity in 10% ethanol/toluene solution (25° C.): 100 cP, butyral groups: 72%), 3 parts of dimethyl silicone oil (viscosity: 100,000 cP), further 1.5 parts of triphenylphosphine as curing accelerator, 1.2 parts of carnauba wax as mold releasing agent, 1.8 parts of carbon powder as colorant, 405 parts of quartz glass powder as filler, 11 parts of antimony trioxide powder as flame retardant aid and 2.4 parts of an epoxy silane type coupling agent for surface treatment of the filler were formulated, kneaded by biaxial rolls at 70° to 100° C., cooled and crushed, followed by tabletting, to prepare an epoxy resin composition for encapsulation of semiconductor device of the present invention.

By use of the composition obtained, a sample element for evaluation of large scale pellet having a PSG layer (8 mm×8 mm) was encapsulated by means of a low pressure transfer molding machine (175° C., 80 kg/cm², 120 sec.).

For the sample elements obtained, thermal cycle test (TCT) and humidity resistance deterioration test (Pressure Cooker test; PCT) were practiced for evaluation of thermal shock resistance and humidity resistance.

Thermal cycle test:

The sample element obtained was subjected to each cooling-heating cycle (between −65° C. to 150° C.) for measurement of characteristic badness. The product having generated badness was dissolved in fuming nitric acid to remove the resin for molding, and generation of cracks was confirmed by microscope.

Humidity resistance deterioration test:

After an element for measurement of the aluminum (Al) wiring corrosion on the element surface was encapsulated, it was exposed to saturated steam of 2.5 atm. and 125° C. in pressure cooker, while it was applied with 15 DC voltage, and the wire breaking badness by Al corrosion was judged.

The results are shown in Table 1.

EXAMPLE 2

A composition of the present invention was prepared in the same manner as in Example 1 except for changing the polyvinyl butyral to 24 parts and the quartz glass powder to 393 parts, and the same evaluation tests were practiced therefor. The results are shown in Table 1.

EXAMPLE 3

Example 1 was repeated except that the polyvinyl butyral in Example 1 was replaced with a polyvinyl formal (softening point: 145° C., vinyl formal content: 83%) to prepare a composition of the present invention, which was then evaluated similarly as in Example 1. The results are shown in Table 1.

EXAMPLE 4

Example 1 was repeated except that the dimethyl silicone oil in Example 1 was replaced with a silicone oil (viscosity: 80,000 cP) with both terminal groups being modified to hydroxyl groups to prepare a composition of the present invention, which was then evaluated similarly as in Example 1. The results are shown in Table 1.

COMPARATIVE EXAMPLE 1

Example 1 was repeated except that 15 parts of quartz glass powder were added in place of 12 parts of the polyvinyl butyral and 3 parts of the dimethyl silicone oil in Example 1 to prepare a composition for comparison, which was then evaluated similarly as in Example 1. The results are shown in Table 1.

COMPARATIVE EXAMPLE 2

Example 1 was repeated except that 12 parts of quartz glass powder were added in place of 12 parts of the polyvinyl butyral in Example 1 to prepare a composition for comparison, which was then evaluated similarly as in Example 1. The results are shown in Table 1.

COMPARATIVE EXAMPLE 3

Example 1 was repeated except that 3 parts of molten silica powder were added in place of 3 parts of the dimethyl silicone oil in Example 1 to prepare a composition for comparison, which was then evaluated similarly as in Example 1. The results are shown in Table 1.

COMPARATIVE EXAMPLE 4

Example 1 was repeated except that a phenolic novolak resin modified with p-octylphenol (ortho ratio: 65%, softening point: 95° C., molecular weight: 680) was employed in place of the phenolic novolak resin in Example 1 to prepare a composition for comparison, which was then evaluated similarly as in Example 1. The results are shown in Table 1.

TABLE 1

|  | Thermal cycle test [cycles] | | | | | | Humidity resistance deterioration test [hrs] | | | | | | |
| --- | --- | --- | --- | --- | --- | --- | --- | --- | --- | --- | --- | --- | --- |
|  | 20 | 40 | 60 | 80 | 100 | 120 | 50 | 100 | 150 | 200 | 250 | 300 | 350 |
| Example 1 | 0/20 | 0/20 | 0/20 | 0/20 | 1/20 | 2/20 | 0/20 | 0/20 | 0/20 | 0/20 | 0/20 | 0/20 | 1/20 |
| Example 2 | 0/20 | 0/20 | 0/20 | 0/20 | 0/20 | 1/20 | 0/20 | 0/20 | 0/20 | 0/20 | 0/20 | 1/20 | 3/20 |
| Example 3 | 0/20 | 0/20 | 0/20 | 0/20 | 1/20 | 1/20 | 0/20 | 0/20 | 0/20 | 0/20 | 1/20 | 1/20 | 2/20 |
| Example 4 | 0/20 | 0/20 | 0/20 | 0/20 | 0/20 | 2/20 | 0/20 | 0/20 | 0/20 | 0/20 | 0/20 | 1/20 | 2/20 |

TABLE 1-continued

| | Thermal cycle test [cycles] | | | | | | Humidity resistance deterioration test [hrs] | | | | | | |
|---|---|---|---|---|---|---|---|---|---|---|---|---|---|
| | 20 | 40 | 60 | 80 | 100 | 120 | 50 | 100 | 150 | 200 | 250 | 300 | 350 |
| Comparative example 1 | 0/20 | 1/20 | 1/20 | 5/20 | 12/20 | 20/20 | 0/20 | 0/20 | 0/20 | 0/20 | 2/20 | 2/20 | 4/20 |
| Comparative example 2 | 0/20 | 0/20 | 1/20 | 1/20 | 2/20 | 12/20 | 0/20 | 0/20 | 0/20 | 0/20 | 0/20 | 2/20 | 6/20 |
| Comparative example 3 | 0/20 | 0/20 | 1/20 | 2/20 | 4/20 | 15/20 | 0/20 | 0/20 | 0/20 | 0/20 | 1/20 | 3/20 | 8/20 |
| Comparative example 4 | 0/20 | 0/20 | 1/20 | 1/20 | 8/20 | 14/20 | 0/20 | 0/20 | 0/20 | 1/20 | 2/20 | 6/20 | 10/20 |

*In the Table, denominator indicates the number of samples provided for the test, and numerator the number of bad samples.

EXAMPLES 5-10

By use of the components shown in Table 2 epoxy resin compositions having compositions as shown in Table 3 were prepared. These compositions were cured at 170° C. for 3 minutes to prepare test strips. Further, curing was effected at 180° C. for 4 hours, followed by evaluation of various characteristics.

Also, by use of the compositions obtained, elements for evaluation of large scale pellet having PSG (phosphoric silicate glass) film on the surface (6 mm×6 mm) were encapsulated with the compositions obtained by means of a low pressure transfer molding machine (175° C., 80 kg/cm², 120 sec.). Subsequently, the resin-encapsulated test devices were subjected to post-curing treatment at 180° C. for 4 hours, followed by thermal cycle test (−65° C.–150° C.). In the thermal cycle test, the characteristic badness of the device was measured for a constant cycle. The product having badness generated was dissolved in fuming nitric acid to dissolve away the resin for molding and generation of cracks was confirmed by means of a microscope. The results of measurement of the thermal cycle test and the characteristics of the molded resin are summarized in Table 3.

COMPARATIVE EXAMPLES 5-7

By use of the components shown in Table 2, compositions as shown in Table 3 were prepared. By use of these compositions, test strips were prepared similarly as in Examples 5-10, and subjected to the evaluation tests similarly as described in Examples 5-10. The results are summarized in Table 3.

TABLE 2

| Name | Content | Trade name | Manufacturer |
|---|---|---|---|
| Epoxy resin A | o-cresol novolak epoxy resin, softening point: 75° C., epoxy equivalent: 200 | — | — |
| Epoxy resin B | brominated phenol novolak type epoxy resin, softening point: 87° C., epoxy equivalent: 270, bromine content: 30% | — | — |
| phenolic resin A | phenolic novolak resin, softening point: 87° C., OH equivalent: 105 | — | — |
| phenolic resin B | rubber-modified phenolic resin, softening point: 97° C., OH equivalent: 139, rubbery component: 30% | RN-3430 | Mitsui Toatsu Kagaku K.K. |
| Curing accelerator | triphenylphosphine | — | — |
| Polyvinyl butyral | polyvinyl butyral resin | BMS | Sekisui Kagaku K.K. |
| Silica powder | quartz glass powder, average particle size: 18 μm | — | — |
| Wax | carnauba wax | — | — |
| Coupling agent | γ-glycidoxypropyltriethoxysilane | — | — |
| Pigment | carbon black | — | — |
| Flame retardant | Antimony trioxide | — | — |
| Additive | Silicone oil | TSF-451-10M | Toshiba silicone K.K. |

TABLE 3

| | Example | | | | | | Comparative example | | |
|---|---|---|---|---|---|---|---|---|---|
| | 5 | 6 | 7 | 8 | 9 | 10 | 5 | 6 | 7 |
| Formulation ratio (parts by weight): | | | | | | | | | |
| Epoxy resin A | 87.0 | 87.6 | 87.6 | 87.0 | 86.5 | 87.4 | 86.0 | 87.0 | 87.4 |
| Epoxy resin B | 13.0 | 12.4 | 12.4 | 13.0 | 13.5 | 12.6 | 12.4 | 13.0 | 12.6 |
| Phenolic resin A | 20.3 | 36.6 | 36.6 | 20.3 | 19.4 | 36.1 | 46.2 | 20.3 | 47.0 |
| Phenolic resin B | 31.6 | 10.8 | 10.8 | 31.6 | 32.9 | 10.9 | — | 31.6 | — |
| Curing accelerator | 1.7 | 1.6 | 1.6 | 1.7 | 1.8 | 1.6 | 1.6 | 1.7 | 1.6 |
| Polyvinyl butyral | 5.6 | 10.8 | 16.1 | 11.3 | 11.8 | 10.9 | — | — | 10.9 |
| Silica powder | 388.7 | 361.8 | 356.5 | 383.0 | 410.6 | 367.8 | 375.3 | 394.4 | 370.5 |
| Wax | 2.3 | 2.2 | 2.2 | 2.2 | 2.4 | 2.2 | 2.2 | 2.3 | 2.2 |
| Coupling agent | 2.8 | 2.7 | 2.7 | 2.7 | 2.9 | 2.7 | 2.7 | 2.8 | 2.7 |
| Pigment | 1.7 | 1.6 | 1.6 | 1.6 | 1.8 | 1.6 | 1.6 | 1.7 | 1.6 |
| Antimony trioxide | 10.1 | 9.7 | 9.7 | 9.7 | 10.6 | 9.8 | 9.7 | 10.2 | 9.8 |
| Silicone oil | — | — | — | — | — | 2.7 | — | — | — |
| Physical properties: | | | | | | | | | |
| Flexural modulus (kg/mm²) | 1300 | 1350 | 1330 | 1240 | 1290 | 1280 | 1460 | 1390 | 1450 |

TABLE 3-continued

|  | Example | | | | | | Comparative example | | |
| --- | --- | --- | --- | --- | --- | --- | --- | --- | --- |
|  | 5 | 6 | 7 | 8 | 9 | 10 | 5 | 6 | 7 |
| Thermal expansion coefficient ($10^{-5}/°C.$) | 1.9 | 1.8 | 1.8 | 1.8 | 1.7 | 1.8 | 2.0 | 1.9 | 1.9 |
| Glass transition temperature (°C.) | 160 | 161 | 160 | 160 | 161 | 162 | 165 | 163 | 165 |
| Thermal cycle test | | | | | | | | | |
| 200 cycles | 0/12 | 0/12 | 0/12 | 0/12 | 0/12 | 0/12 | 1/12 | 0/12 | 0/12 |
| 400 cycles | 0/12 | 0/12 | 0/12 | 0/12 | 0/12 | 0/12 | 12/12 | 1/12 | 0/12 |
| 600 cycles | 0/12 | 0/12 | 0/12 | 0/12 | 0/12 | 0/12 | — | 6/12 | 3/12 |
| 800 cycles | 0/12 | 1/12 | 1/12 | 0/12 | 0/12 | 0/12 | — | 12/12 | 9/12 |
| 1000 cycles | 1/12 | 2/12 | 3/12 | 0/12 | 0/12 | 0/12 | — | — | 12/12 |

As described in detail above, the epoxy resin composition for encapsulation of semiconductor device of the present invention can retain its high glass transition temperature in the cured product thereof and also has low modulus of elasticity as well as excellent humidity resistance and thermal shock resistance, and it is particularly useful for encapsulation of semiconductor devices having a large scale pellet of high degree of integration, etc., and its practical value is great.

What is claimed is:

1. An epoxy resin composition for encapsulation of semiconductor device, comprising the components (a), (b), (c) and at least one of the components (d) and (e) as shown below:
    (a) 100 parts by weight of an epoxy resin having at least two epoxy groups in one molecule;
    (b) 8 to 65 parts by weight of a novolak phenolic resin with an ortho ratio less than 50%;
    (c) 1.2 to 4.0 parts by weight of a polyvinyl acetal resin;
    (d) 0.8 to 30 parts by weight of a silicone oil;
    (e) 4 to 80 parts by weight of a rubber-modified phenolic resin, which resin (e) is distinct from resin (b); and
    (f) silica powder in an amount ranging between about 260 to 850 parts by weight,
said resin composition having a glass transition temperature of 150° C. or higher.

2. An epoxy resin composition according to claim 1, wherein the component (a) is an epoxy resin with an epoxy equivalent of 100 to 300.

3. An epoxy resin composition according to claim 1, wherein the component (b) is a novolak phenolic resin with a hydroxyl equivalent of 100 to 150.

4. An epoxy composition according to claim 1, wherein the component (d) has a viscosity of 500 to 1,000,000 cP at 20° C.

5. An epoxy resin composition according to claim 1, wherein the composition comprises the components (a), (b), (c) and (d).

6. An epoxy resin composition according to claim 1, wherein the composition comprises the components (a), (b), (c) and (e).

7. An epoxy resin composition according to claim 6, wherein the composition further comprises a curing accelerator and silica powder.

8. An epoxy resin composition according to claim 6, wherein the component (a) is a novolak epoxy resin.

9. An epoxy resin composition according to claim 8, wherein the component (a) is a novolak epoxy resin having an epoxy equivalent of 175 to 220.

10. An epoxy resin composition according to claim 6, wherein the component (b) is a phenolic novolak resin.

11. An epoxy resin composition according to claim 5, wherein the component (c) is polyvinyl butyral resin.

12. An epoxy resin composition according to claim 1, wherein the composition comprises the components (a), (b), (c), (d) and (e).

13. An epoxy resin composition for encapsulation of semiconductor device having a glass transition temperature of 150° C. or more, comprising the components (a), (b), (c) and at least one of the components (d) and (e) as shown below:
    (a) 100 parts by weight of an epoxy resin having at least two epoxy groups in one molecule, said epoxy resin is substituted with 0 to 20 parts by weight of a brominated phenol novolak epoxy resin;
    (b) 12 to 55 parts by weight of a novolak phenolic resin with an ortho ratio less than 50%;
    (c) 5 to 30 parts by weight of a polyvinyl acetal resin;
    (d) 1.6 to 6 parts by weight of a silicone oil;
    (e) 8 to 60 parts by weight of a rubber-modified phenolic resin, which resin (e) is distinct from resin (b); and
    (f) silica powder in an amount ranging between about 260 to 850 parts by weight.

* * * * *